United States Patent [19]

Kirchhein

[11] 4,017,045
[45] Apr. 12, 1977

[54] FLAP COMPENSATION SYSTEM FOR USE WHEN CONTROLLING THE PITCH ATTITUDE OF AN AIRCRAFT

[75] Inventor: Albert T. Kirchhein, Montvale, N.J.

[73] Assignee: The Bendix Corporation, Teterboro, N.J.

[22] Filed: Dec. 24, 1975

[21] Appl. No.: 644,217

[52] U.S. Cl. .................. 244/194; 244/178; 318/565
[51] Int. Cl.² ......................................... G05D 1/00
[58] Field of Search ..................... 73/178 R, 178 T; 235/150.22, 150.2; 244/75 R, 76 R, 87, 76 A, 177, 178, 181, 183, 186, 194; 318/563, 565, 583, 584; 340/27 R, 27 A, 27 T

[56] References Cited

UNITED STATES PATENTS

| 3,215,374 | 11/1965 | Olshausen | 244/181 X |
| 3,422,327 | 1/1969 | McBrayer et al. | 318/563 |
| 3,643,146 | 2/1972 | Ferguson et al. | 318/565 |

Primary Examiner—Stephen G. Kunin
Attorney, Agent, or Firm—Anthony F. Cuoco

[57] ABSTRACT

A flap compensation system is provided which reduces the pilot applied force required to hold the pitch attitude of an aircraft within specified limits upon pilot operation of the aircraft flaps by automatically displacing the horizontal stabilizer of the craft as a function of flap displacement.

4 Claims, 4 Drawing Figures

4,017,045

FLAP COMPENSATION SYSTEM FOR USE WHEN CONTROLLING THE PITCH ATTITUDE OF AN AIRCRAFT

BACKGROUND OF THE INVENTION

1. Field of the Invention

This invention relates generally to controlling the pitch attitude of an aircraft, and particularly to controlling the pitch attitude of the craft through actuation of the aircraft flaps and horizontal stabilizer. More particularly, this invention relates to means for automatically controlling the displacement of the horizontal stabilizer as a function of the manual displacement of the flaps.

2. Description of the Prior Art

Aircraft pitch attitude is controlled by pilot operation of the aircraft flaps which are displaceable auxiliary air foils attached to the trailing edge of the wings of the craft. In large aircraft a significant amount of pilot exerted force is necessary to maintain the pitch attitude within specified limits. Various regulations have been promulgated whereby in, view of the pilot work load and his necessary attention to the various aspects of flying the craft, this force must be maintained below a predetermined limit. In order to accomplish this, it is desirable to provide a compensating affect through the horizontal stabilizer of the craft which is an auxiliary air foil attached to the tail assembly of the craft. The invention to be herein described provides the compensating affect by automatically controlling the displacement of the horizontal stabilizer as a function of the manual displacement of the flaps.

SUMMARY OF THE INVENTION

This invention contemplates a flap compensation system for controlling the pitch attitude of an aircraft including means for providing a signal corresponding to flap displacement. The signal is shaped and monitored and automatically actuates the horizontal stabilizer of the craft whenever the flap displacement exceeds a predetermined threshold. A signal corresponding to the displacement of the horizontal stabilizer is summed with the shaped flap displacement signal, and which summed signal corresponds to stabilizer displacement error. The polarity of the error signal indicates whether the flaps are being extended or retracted for operating the horizontal stabilizer in an up or down direction, respectively.

A failure detector is enabled if the horizontal stabilizer is not operated when the stabilizer displacement error signal exceeds a predetermined threshold. In order to accommodate false failures which may momentarily occur, a time delay feature is incorporated into the device whereby the stabilizer displacement error signal must remain above its threshold for a predetermined interval before a failure is detected. Since the displacement of the horizontal stabilizer may vary with flight conditions, the stabilizer position is synchronized prior to operation of the flaps. A flap rate signal is used to modulate or control the rate of displacement of the horizontal stabilizer to provide the correct pitching moment for all variations of flap displacement rate.

One object of this invention is to provide a flap compensation system for controlling the pitch attitude of an aircraft whereby a pilot exerted force to control the flaps is reduced by automatically controlling the displacement of the horizontal stabilizer of the craft as a function of flap displacement.

Another object of this invention is to provide a stabilizer displacement error signal, the polarity of which indicates whether the flaps are being extended or retracted, and which signal is used to operate the horizontal stabilizer in either the upward or downward direction, respectively.

Another object of this invention is to provide a failure detector which is enabled if an appropriate horizontal stabilizer displacement detector fails to operate when the stabilizer displacement error exceeds a predetermined level.

Another object of this invention is to provide a time delay feature whereby the stabilizer displacement error signal must be maintained for a predetermined interval to eliminate false or nuisance failure detections.

Another object of this invention is to synchronize stabilizer position prior to flap displacement.

Another object of this invention is to modulate or control stabilizer displacement as a function of flap rate.

The foregoing and other objects and advantages of the invention will appear more fully hereinafter from a consideration of the detailed description which follows, taken together with the accompanying drawings wherein one embodiment of the invention is illustrated by way of example. It is to be expressly understood however, that the drawings are for illustration purposes only and are not to be construed as defining the limits of the invention.

DESCRIPTION OF THE INVENTION

Figure 1:
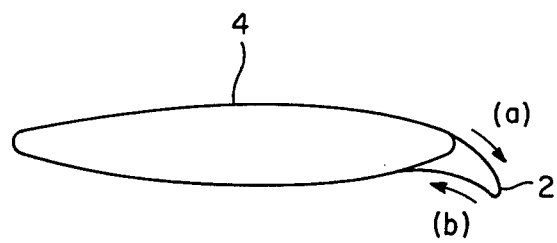
FIG. 1 is a diagrammatic representation showing the flap surface of an aircraft.

In accordance with the invention, the pitch attitude of an aircraft is controlled by pilot actuation of aircraft flaps 2, which are auxiliary air foils displaceably attached to the wings 4 of the craft so as to be extended or retracted relative to the wings. Flaps 2 are extended as shown in FIG. 1 when displaced in the direction of arrow (a) and are retracted when displaced in the direction of arrow (b) to provide a streamlined wing surface, the aforenoted being well known in the art.

Figure 2:
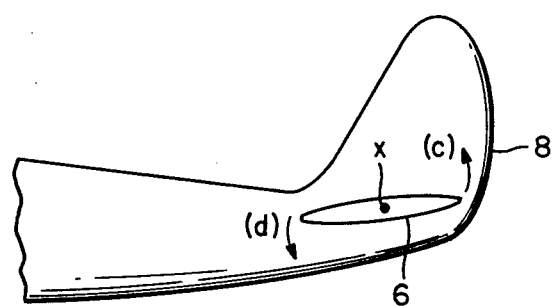
FIG. 2 is a diagrammatic representation showing the horizontal stabilizer surface of the aircraft.

In order to maintain the pilot exerted force required to extend or retract flaps 2 within specified limits, aircraft stabilizer 6, which is an auxiliary air foil displaceably attached to tail assembly 8 of the craft is automatically operated to pivot about an axis X shown in FIG. 2 in either the upward or downward direction as designated by arrows (c) and (d), respectively, in the figure.

Figure 3:
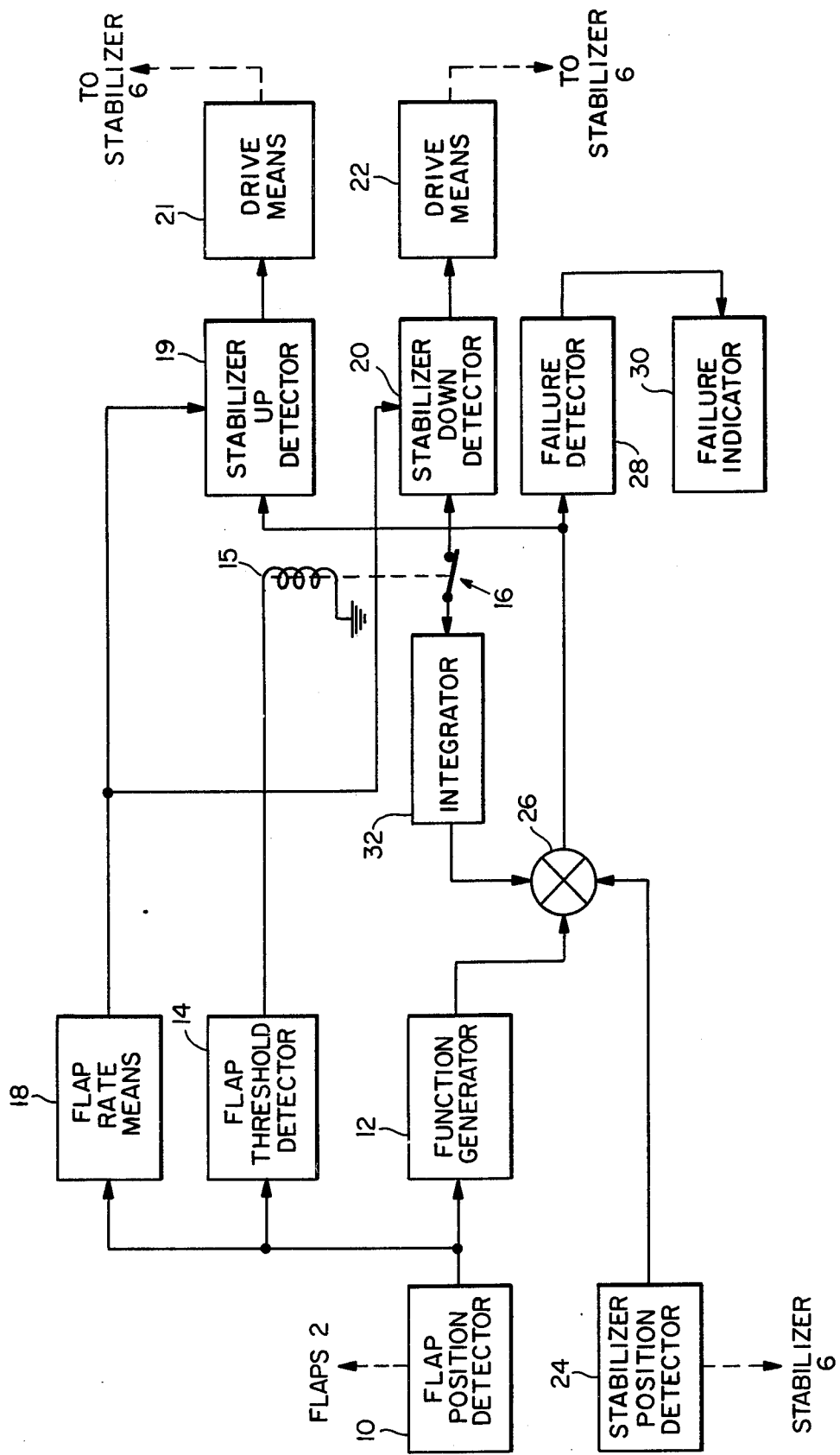
FIG. 3 is a block diagram showing the preferred embodiment of the invention.

With the above in mind, reference will now be made to FIG. 3 which shows a preferred embodiment of the invention. A flap displacement detector 10, which may be any conventional mechanical to electrical transducer such as a potentiometer or synchro or the like, is suitably affixed to flaps 2 and provides a signal corresponding to the displacement of flaps 2 relative to a predetermined position of the flaps.

Figure 4:
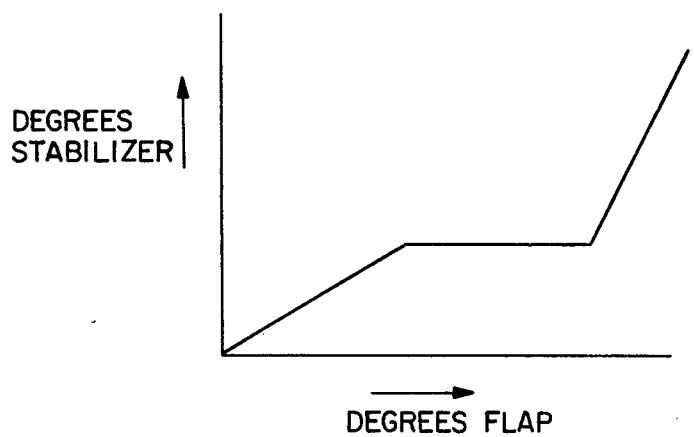
FIG. 4 is a graphical representation showing a shaped flap displacement signal.

The signal from flap displacement detector 10 is applied to a function generator 12, and which function generator shapes the flap displacement signal as shown in the graphical representation of FIG. 4. Thus, function generator 12 provides a signal which is shaped so that the signal is proportional to the degrees of stabilizer displacement required per degree of flap displacement for the particular aircraft with which the system of the invention is to be used.

The flap displacement signal from detector 10 is monitored by a flap threshold detector 14, which may be a conventional voltage level detector, and which provides a signal which actuates a relay 15 to operate a normally closed switch 16 for reasons to be hereinafter described.

The signal from flap displacement detector 10 is applied to a flap rate means 18, which may be a concentional high pass filter, providing a flap displacement rate signal. The displacement rate signal is applied to a stabilizer up detector 19 to a stabilizer down detector 20, and which detectors 19 and 20 may be conventional voltage level detectors for providing signals when the flap displacement rate signal upon displacement of the flaps in the appropriate direction exceeds a predetermined level. A drive means 21 is operated by the signal from stabilizer up detector 19 and a drive means 22 is operated by the signal from stabilizer down detector 19 as the case may be. Drive means 21 and 22 may be motors or the like which are suitably coupled to the horizontal stabilizer of the craft for actuating said stabilizer in the appropriate direction as will be hereinafter described.

A stabilizer displacement detector 24, which may be any mechanical to electrical transducer such as a potentiometer or synchro or the like, is suitably affixed to stabilizer 6 and provides a signal corresponding to the displacement of the stabilizer relative to a predetermined position of the stabilizer. The signal from stabilizer position detector 24 is applied to a summing means 26 and summed thereby with the shaped flap displacement signal from function generator 12, and which summing means 26 which may be a conventional summing amplifier. The summed signal from summing means 26 is a stabilizer displacement error signal. The polarity of the error signal indicates whether the flaps are being extended or retracted and the signal operates either stabilizer up detector 19 or stabilizer down detector 20 in accordance with said polarity as the case may be.

The signal from summing means 26 is applied to a failure detector 28 which may be a conventional voltage level detector. If the error signal from summing means 26 exceeds a predetermined threshold as detected by detector 28, a "failure" indication is provided by an indicator 30 which may be a visual or audio alarm device as the case may be. Normally the error signal during flap operation is above the up and down detector threshold and below the failure detector threshold. This precludes runaway operation of the horizontal stabilizer if a stabilizer displacement change is inadvertently commanded.

It is to be expected that due to noise and due to the non-instantaneous response of horizontal stabilizer actuators 21 and 22, the error signal from summing means 26 may rise momentarily above the threshold of failure detector 28, when, in fact, no failure has occurred. To reduce the likelihood of false alarms or failure indications as may be thus provided, time delay means are incorporated into failure detector 28, and which time delay means may be a conventional R-C circuit as is well known to those skilled in the art. Thus, the error signal must remain above the threshold of detector 28 for a predetermined interval as determined by the R-C circuit for a failure indication to occur.

The required stabilizer position as a function of flap position varies non-linearly. Further, it is necessary to avoid stabilizer displacement errors which would occur if stabilizer displacement were ignored. Both of these conditions are satisfied by synchronizing the stabilizer displacement error signal prior to flap displacement.

To accomplish the above, the stabilizer displacement error signal is applied to an integrator 32 through closed switch 16 and returned from the integrator to summing means 26 to drive the output therefrom to null. Thus, the error signal is always held at null prior to flap displacement. When the flap displacement exceeds a predetermined threshold as determined by detector 14, the output from the detector operates relay 15 to open switch 16. The stabilizer displacement at that instant becomes a reference displacement. Thus, a synchronizing loop including switch 16, summing means 26 and integrator 32 is provided, and which loop may have a time constant of less than fifty milliseconds.

It will now be seen from the aforenoted description of the invention that a flap compensation system has been described wherein the pilot applied force required to displace the aircraft flaps to control the pitch attitude of the craft is maintained within specified limits by automatically controlling the displacement of the aircraft horizontal stabilizer as a function of flap displacement.

Although a single channel system has been shown and described it will be understood that a dual channel system, with each channel operating in conjunction with the other, may be utilized for redundancy purposes as may be required. In this event identical commands are required from each channel to displace the stabilizer whereby a hardover failure of one channel cannot cause a runaway stabilizer displacement condition as will be understood by those skilled in the art.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in in the art.

What is claimed is:

1. Apparatus for controlling the pitch attitude of an aircraft through aircraft flaps and a horizontal stabilizer of the aircraft, comprising:
    means for providing a signal corresponding to the pilot effected rate of displacement of the flaps;
    detector means connected to the flap displacement rate signal means and responsive to the signal therefrom for providing a signal when the flap displacement rate signal exceeds a predetermined threshold;
    means connected to the detector means and coupled to the horizontal stabilizer and responsive to the signal from the detector means for displacing the stabilizer;
    means for providing a signal corresponding to the displacement of the flaps;
    means for providing a signal corresponding to the displacement of the horizontal stabilizer;
    means for combining the flap displacement signal and the stabilizer displacement signal and for providing a stabilizer displacement error signal having a sense in accordance with the sense of the displacement of the flaps;

the detector means being connected to the combining means and responsive to the error signal therefrom for providing a signal when the flap displacement rate signal exceeds a predetermined threshold in a sense in accordance with the sense of the displacement of the flaps;

other detector means connected to the combining means and responsive to the error signal therefrom above a predetermined threshold for providing a failure signal;

means connected to the other detector means and responsive to the failure signal therefrom for indicating a failure; and the other failure detector means includes time delay means whereby the error signal must remain above the predetermined threshold for a predetermined interval for the failure signal to be provided.

2. Apparatus as described by claim 1, wherein the means for providing a signal corresponding to the pilot effected rate of displacement of the flaps includes;

means for providing a signal corresponding to the flap displacement signal; and means for filtering the flap displacement signal to provide the displacement rate signal.

3. Apparatus for controlling the pitch attitude of an aircraft through aircraft flaps and a horizontal stabilizer of the aircraft comprising:

means for providing a signal corresponding to the pilot effected rate of displacement of the flaps;

detector means connected to the flap displacement rate signal means and responsive to the signal therefrom for providing a signal when the flap displacement rate signal exceeds a predetermined threshold.

means connected to the detector means and coupled to the horizontal stabilizer and responsive to the signal from the detector means for displacing the stabilizer;

means for providing a signal corresponding to the displacement of the flaps;

means for providing a signal corresponding to the displacement of the horizontal stabilizer;

means for combining the flap displacement signal and the stabilizer displacement error signal having a sense in accordance with the sense of the displacement of the flaps;

the detector means being connected to the combining means and responsive to the error signal therefrom for providing a signal when the flap displacement rate signal exceeds a predetermined threshold in a sense in accordance with the sense of the displacement of the flaps;

an integrator;

a normally closed switch connecting the integrator to the combining means for integrating the error signal from the combining means;

the integrator being connected to the combining means for returning the integrated error signal to the combining means for driving the error signal to a null;

other detector means connected to the flap displacement signal means for providing a signal when the flap displacement signal exceeds a predetermined threshold; and means connected to the other detector means and to the normally closed switch and responsive to the signal from the other detecting means for opening the switch, whereupon the stabilizer displacement is synchronized to the flap displacement at the instant the switch is opened.

4. Apparatus for controlling the pitch attitude of an aircraft through aircraft flaps and a horizontal stabilizer of the aircraft, comprising:

means for providing a signal corresponding to the pilot effected rate of displacement of the flaps;

detector means connected to the flap displacement rate signal means and responsive to the signal therefrom for providing a signal when the flap displacement rate signal exceeds a predetermined threshold;

means connected to the detector means and coupled to the horizontal stabilizer and responsive to the signal from the detector means for displacing the stabilizer;

means for providing a signal corresponding to the displacement of the flaps;

means for providing a signal corresponding to the displacement of the horizontal stabilizer;

means for combining the flap displacement signal and the stabilizer displacement signal and for providing a stabilizer displacement error signal having a sense in accordance with the sense of the displacement of the flaps;

the detector means being connected to the combining means and responsive to the error signal therefrom for providing a signal when the flap displacement rate signal exceeds a predetermined threshold in a sense in accordance with the sense of the displacement of the flaps; and means connected to the flap displacement signal means for shaping the flap displacement signal so that said signal is proportional to the magnitude of stabilizer displacement per unit magnitude of flap displacement.

* * * * *